March 27, 1928.  1,664,300
B. F. KELLY
PROCESS OF SILVERING AND BEVELING SMALL MIRRORS
Filed July 16, 1926  2 Sheets-Sheet 1
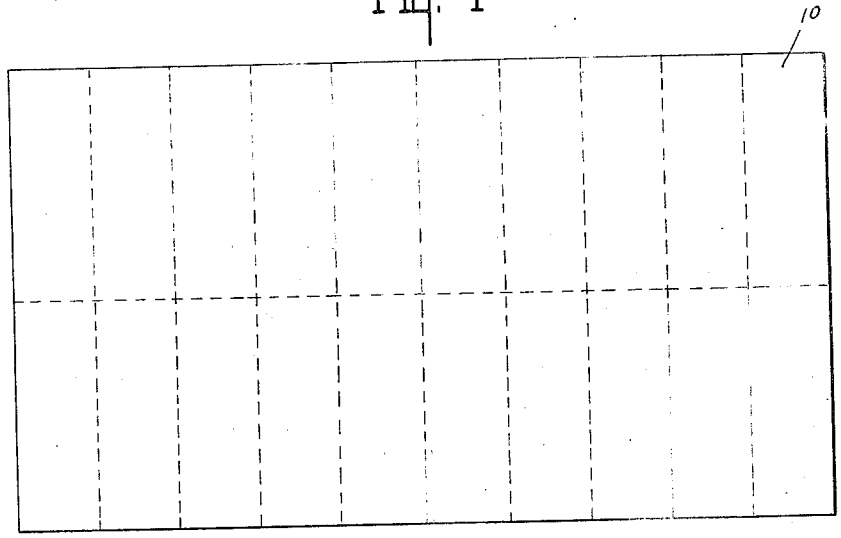
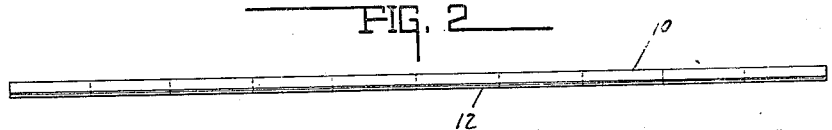
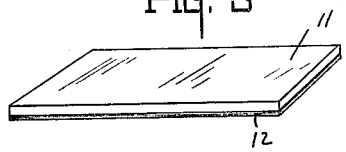
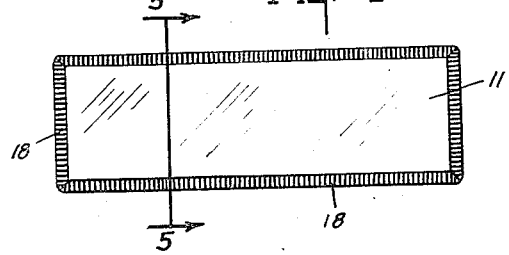
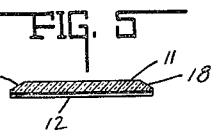
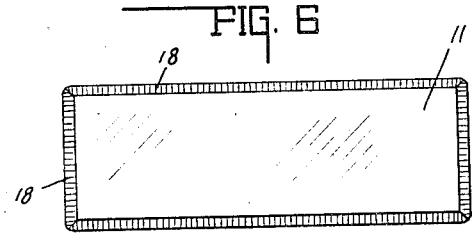
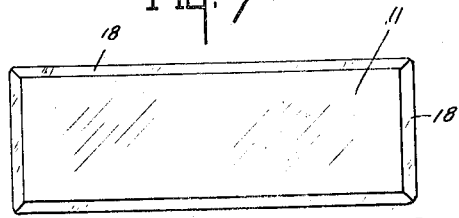
INVENTOR.
BERT F. KELLY.
BY
ATTORNEYS.

March 27, 1928. 1,664,300
B. F. KELLY
PROCESS OF SILVERING AND BEVELING SMALL MIRRORS
Filed July 16, 1926 2 Sheets-Sheet 2
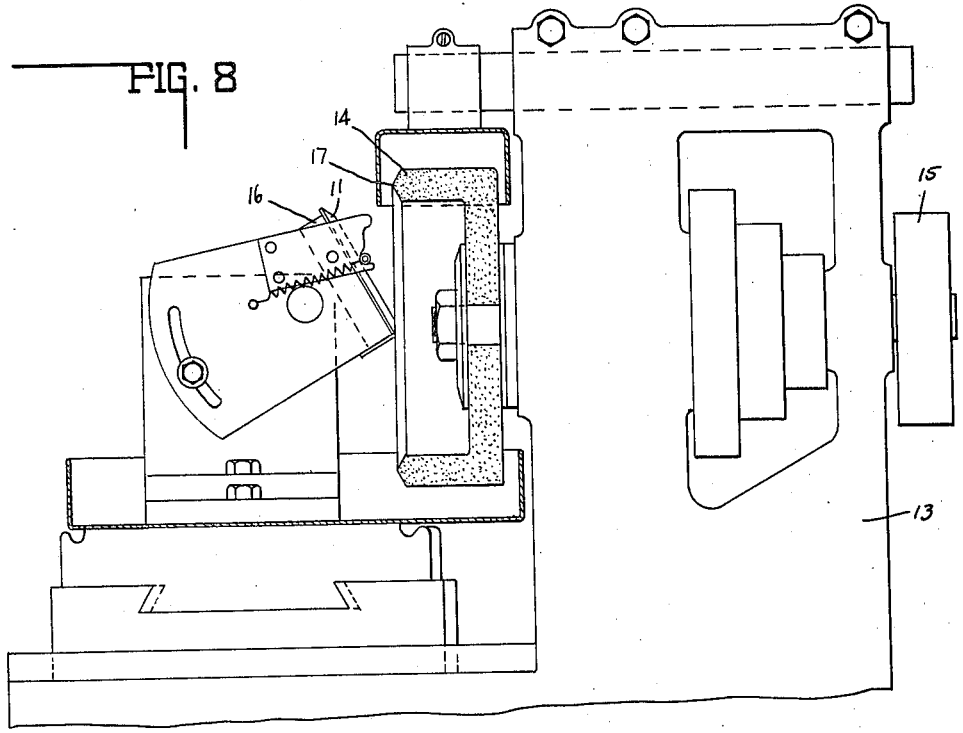
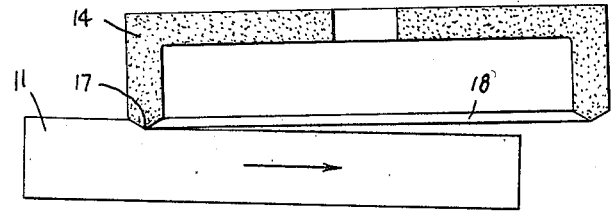
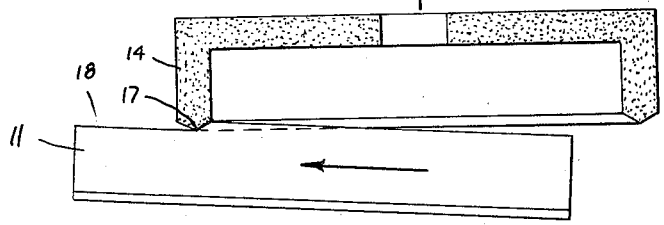
INVENTOR.
BERT F. KELLY.
BY
ATTORNEYS.

Patented Mar. 27, 1928.

1,664,300

UNITED STATES PATENT OFFICE.

BERT F. KELLY, OF INDIANAPOLIS, INDIANA, ASSIGNOR TO PARTS CORPORATION, OF INDIANAPOLIS, INDIANA, A CORPORATION.

PROCESS OF SILVERING AND BEVELING SMALL MIRRORS.

Application filed July 16, 1926. Serial No. 122,891.

This invention pertains to a new process of manufacturing small beveled mirrors, particularly used as rear view mirrors for automobiles.

Heretofore in practice, it has been customary to grind and polish the beveled edge of the mirror by hand before it is beveled, the operator holding the mirror at an angle against the surface of the emery wheel or roughing wheel. It is necessary to bevel or edge the glass in this manner before silvering in order that the operator may see through it for obtaining the proper bevel. The smoothing pumice and polishing processes are similarly carried on necessarily before the mirror is silvered for the same reason. This necessitates the silvering of small pieces of glass which is wasteful.

It is the object of this invention to not only mechanically bevel or edge the glass, but to effect an appreciable saving in the cost of production of small mirrors of this character by first silvering and "backing" a large plate of glass from which a number of smaller mirrors may be cut. A considerable saving is thus effected by reason of the fact that it is substantially as costly to silver a small piece of glass as it is to silver a large piece owing to the nature of the labor involved and the drying period. By the new process, assuming that a large piece of glass containing 20 small pieces is first silvered, 20 small mirrors can be silvered at substantially the cost of a single small mirror by the old process. This enable production under the new process to be increased nearly 20 times over what it was in the old process so far as the silvering operation is concerned.

Another feature of the process resides in the mechanical beveling or edging of the glass by cutting rather than the usual grinding, thus saving one step in the usual process and securing a much more rapid production as well as a more perfect and a truer bevel or edge.

Still another feature of the process resides in the production thereby of a novel and peculiarly finished beveled surface having a plurality of transverse ribs which gives the bevel a "frame-like" appearance.

The full nature of the invention will be understood from the accompanying drawings and the following description and claim.

In Fig. 1 there is shown a large plate of glass from which a plurality of mirrors are cut as indicated by dotted lines. Fig. 2 is a side elevation thereof showing the silvering and "backing" thereon. Fig. 3 is a perspective view of one of the small mirrors cut therefrom. Fig. 4 is a plan view of a small mirror with the bevel cut therefrom by the first operation. Fig. 5 is a section taken on the line 5—5 of Fig. 4. Fig. 6 is the same as Fig. 5 showing the bevel upon being smoothed. Fig. 7 shows the bevel upon being polished. Fig. 8 shows an elevation of the cutting or rough grinding machine with a section taken through the grinding wheel. Fig. 9 is an enlarged view illustrating the grinding with respect to the mirror when moving in the direction of the arrow. Fig. 10 is the same as Fig. 9 showing the same action when moving in the reverse direction.

The process consists in first taking a piece of glass 10 of dimensions that are multiples of the desired dimensions of the small mirrors to be made therefrom. As shown herein, there is a plate glass 25 inches in length and 14" in width from which 20 mirrors 11 may be cut 2½ inches in width and 7 inches in length. The plate glass 10 is first silvered in accordance with the usual process so as to provide a silvered backing 12. Inasmuch as the operations in the silvering process must be gone through with regardless of the size of the glass, after which it must remain on the drying table for a period of time, it is obvious that an operator can silver a plate of glass of comparatively large dimensions as well as a smaller piece in the same time, and since the glass must be first rinsed with the silvering solution which is then wasted, it takes little more silvering solution for a large piece than it does for a small piece. Thus an operator with the same equipment can silver the glass 10 in the same time that he can silver the glass 11, and as 20 pieces 11 may be obtained from the silvered piece 10, it is obvious that there will be considerable saving in time and material.

After the glass has been silvered and cut into the desired size it is placed upon the machine shown in Fig. 8 which comprises the usual pedestal 13, a power driven manufactured "cup" grinding wheel 14 driven by suitable power through the pulley 15. Mounted on the machine there is a transversely traveling carriage 16 for receiving the glass plate 11 and feeding it against one edge of the wheel 14 as illustrated in Figs. 9 and 10. The glass is then caused to travel in the direction of the arrow as shown in Fig. 9 transversely so as to cause the wheel to cut off the entire bevel during a single passage of the glass. The glass is then reversed on the table 11 and passed back in the direction of the arrow shown in Fig. 10 so that the opposite side of the glass will be similarly beveled. The end edges are treated in the same manner as shown and described with respect to the side edges.

It may here be noted that whereas the old process comprised grinding off the surface of the glass edge by applying it to the surface of the grinding or milling wheel, the edge of the glass is cut off in this process by the pointed portion of the wheel 14 as indicated at 17. This leaves a plurality of transverse ribs 18 as shown in Figs. 4, 9 and 10. The pointed portion of the grinding wheel is maintained and self-dressed in the form of a sharp cutting point by feeding the glass in both directions on the same side of the wheel, without permitting the glass to touch the other side of the wheel as illustrated in Figs. 9 and 10. This action dresses down both sides of the grinding surface of the wheel at an angle to each other so as to maintain the pointed cutting edge 17. This is very material and important to the process for various reasons. In the first place it is essential to maintain a sharp pointed cutting surface in order to prevent chipping or overheating of the glass. It would be impossible to cut the edge of the glass in this manner if it were applied to a surface of any appreciable area. Furthermore such a surface would not only chip the edges of the glass but would produce such heat as to cause it to become cracked.

A further feature of this step of the process resides in the action of the sharply pointed cutting surface of the wheel wherein it produces the ribs 18 by its cutting action which give a finished frame-like and satiny appearance and makes a very desirable mirror for the trade without any further steps being taken to dress it down and polish it.

However, if it is desired to have a ground finish on the bevel, or a clear and polished finish, the glass may then be placed in a suitable carriage which will hold it at the desired angle against a smoothing grinder of the usual character, the only difference being that whereas such bevels heretofore have been held against such grinder by hand, they are herein accurately positioned by the carriage so that it is not necessary for a skilled operator to look through an unsilvered piece of glass in order to obtain the desired results. If it is further desired that the bevel be of a polished finish, it may then in the same manner be applied to a polishing grinder.

From the above it will be apparent that not only a very appreciable saving is made in the cost of silvering the glass, but the bevel edge of the glass may be ground to accurate limits and positive duplication of parts, as well as obtaining rapid production, uniform and neat appearance in the finish. By means of the process of grinding or beveling the edges of the glass as above outlined, non-transparent or opaque plates of glass may be accurately and rapidly beveled or edged as well as the silvered glass.

It will be noted that the transverse ribs 18 formed on the beveled surface while appearing to be straight, are in reality an arc equal to the circumference of the cup grinding wheel 14 and spaced from each other in accordance with the traveling speed of the carriage 16.

The invention claimed is:

The process of beveling a glass plate consisting in providing a cup wheel having an inverted V-shaped cutting edge, mounting the glass on a carriage at a predetermined angle to the cutting edge of said wheel and gradually moving said glass is one direction while in engagement with one side of said edge for causing said edge to cut a flat bevel on said glass during one passage of the glass, and thereafter reversing the movement of the glass with respect to said wheel and beveling another edge thereof by its engagement with the other side of said cutting edge so as to cause said wheel to be self-dressed and thereby maintain a relatively sharp cutting edge.

In witness whereof, I have hereunto affixed my signature.

BERT F. KELLY.